Figure 1A:
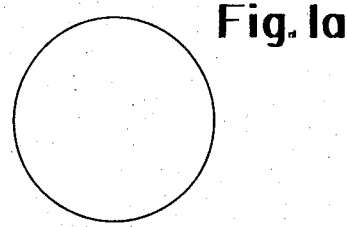

United States Patent
George et al.

[15] 3,689,772
[45] Sept. 5, 1972

[54] PHOTODETECTOR LIGHT PATTERN DETECTOR

[72] Inventors: Nicholas George, Pasadena; James T. Thomasson, Sunland; Abraham Spindel, Los Angeles, all of Calif.

[73] Assignee: Litton Systems, Inc., Beverly Hills, Calif.

[22] Filed: Aug. 18, 1971

[21] Appl. No.: 172,629

[52] U.S. Cl. ............250/211 J, 356/71, 350/162 SF, 317/235 N
[51] Int. Cl. ............................................H01l 15/00
[58] Field of Search................250/211, 211 J, 212; 350/162 SF; 356/71; 317/235 N

[56] References Cited

UNITED STATES PATENTS

| | | | |
|---|---|---|---|
| 3,046,405 | 7/1962 | Emeis | 250/211 J |
| 3,164,795 | 1/1965 | Lubbe | 250/211 X R |
| 3,195,396 | 7/1965 | Horwitz et al. | 350/162 SF |
| 3,222,531 | 12/1965 | Morrison | 250/211 J |
| 3,480,783 | 4/1969 | Mankarious | 250/211 J |

*Primary Examiner*—Walter Stolwein
*Attorney*—Alan C. Rose et al.

[57] ABSTRACT

A special photodetector array for sampling the light energy distribution in a plane, such as the diffraction or fourier-transform pattern of an illuminated object transparency which is obtained by a well-known optical configuration in the rear focal plane of a simple lens. The function of the array, in this diffraction pattern measurement example, is to provide simultaneous and nearly instantaneous voltage readouts corresponding to the power spectral density and to the angular variations in the spatial structure of the input object's pattern. The array comprises first and second semi-circular sub-arrays. The first sub-array comprises a plurality of concentric annular detectors, such as hemi-rings. The second sub-array comprises a plurality of detectors extending approximately radially from near to the center of the first sub-array. Each detector of the array is provided with a separate attached electrical conductor. The conductors attached to the ring detectors are positioned in portions of approximately radial sector gaps separating the two sub-arrays.

10 Claims, 5 Drawing Figures

PATENTED SEP 5 1972 3,689,772

PHOTODETECTOR LIGHT PATTERN DETECTOR

This invention relates to photoelectric devices and more particularly to devices comprising an array of photocells each with a separate attached electrical conductor. Specifically, it relates to a photodetector array adapted to sample the distribution of energy in a planar pattern characterized by symmetry in intensity about an origin (or center point), such as a typical diffraction pattern.

When an object is illuminated by a beam of collimated light, such as that generated by an incandescent lamp or by a laser, the wavefronts of the beam (i.e., the cross section of the beam at any specific time) is modified by each point on the illuminated object. In any given reference plane through the modified beam, the modified wavefront contains information pertaining to a composite electromagnetic field whose distributions of phase and amplitude are characteristic of the illuminated object. The amplitude and phase of said modified wavefront is precisely calculable by those versed in the theory of electromagnetic wave propagation.

Whereas in the past both electronic and optical pattern recognition techniques classified objects recorded on transparencies either by line patterns and their angular correlations or alternatively by observing general pattern texture, this invention makes it possible with one device to simultaneously and nearly instantaneously record both. This is accomplished by measurements of diffraction pattern characteristics in the rear focal-plane of a spherical lens. A special photoelectric array has been invented for these measurements to enable the recording of (a) radial lobe structure and (b) power spectral density.

If the composite wavefront is focused onto the rear focal-plane of a spherical lens the resulting distribution of light energy is uniquely characteristic of the object. The information contained in this light distribution or diffraction pattern may be utilized to recognize or classify the object. In certain systems employing diffraction pattern analysis for object recognition or classification, it is desirable to measure the energy in predetermined portions of the pattern surrounding the optical axis on a simultaneous or nearly simultaneous basis.

Accordingly, an object of this invention is to provide an array of photodetectors adapted to simultaneously detect the intensity of light energy in a plurality of predetermined portions of a diffraction pattern.

The light energy in a diffraction pattern normally consists of a bright central spot on the optical axis, surrounded by regions of various brightnesses and spacings, such as rings. There may also be bright lobes or spikes extending radially from the center, as well as isolated spots. Since a typical diffraction pattern is characterized by symmetry in intensity about the center point, any line through the center divides the pattern into two halves, each of which contains all of the features defining the energy distribution and hence contains much information relating to the object from which the pattern is generated. As a result, the energy distribution in the "single" pattern may be determined by an array of detectors comprising "two" sub-arrays, each samples one-half of the pattern. Each sub-array detects the energy distribution along one of the coordinates of a plane polar coordinate system in the plane of the pattern.

A feature of the invention is a photodetector array comprising two sub-arrays, each of which is adapted to detect the energy distribution of a diffraction pattern along one coordinate of the polar coordinate system in the plane of the pattern.

In the preferred embodiment, the invention comprises a circular array of detectors adapted to determine the radial and angular distribution of energy in a polar coordinate system. The array includes two semi-circular sub-arrays, one of which comprises a plurality of annular elements or zones while the other comprises a plurality of sector-portions detectors. Each detector of the array is electrically isolated from the others and is attached to a separate electrical conductor for connection to other apparatus with which it may be used.

Detectors embodying the invention find application in diffraction pattern sampling systems of the type disclosed in copending patent application Ser. No. 181,866, filed Sept. 20, 1971, by Jensen et al. a Another application of the invention is in a system for preparing holographic filters, such as that disclosed in copending patent application Ser. No. 181,867, filed Sept. 20, 1971, by Neils J. Jensen et al. Both of the referenced copending application are assigned to the assignee hereof.

Figure 1B:
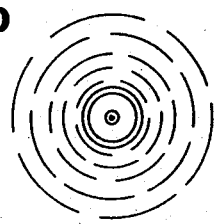
Figure 1C:
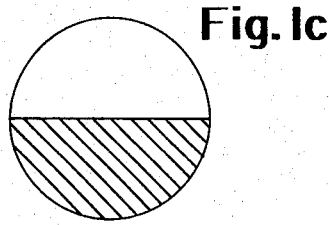
Figure 1D:
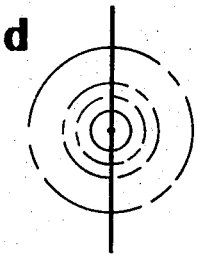
Figure 2:
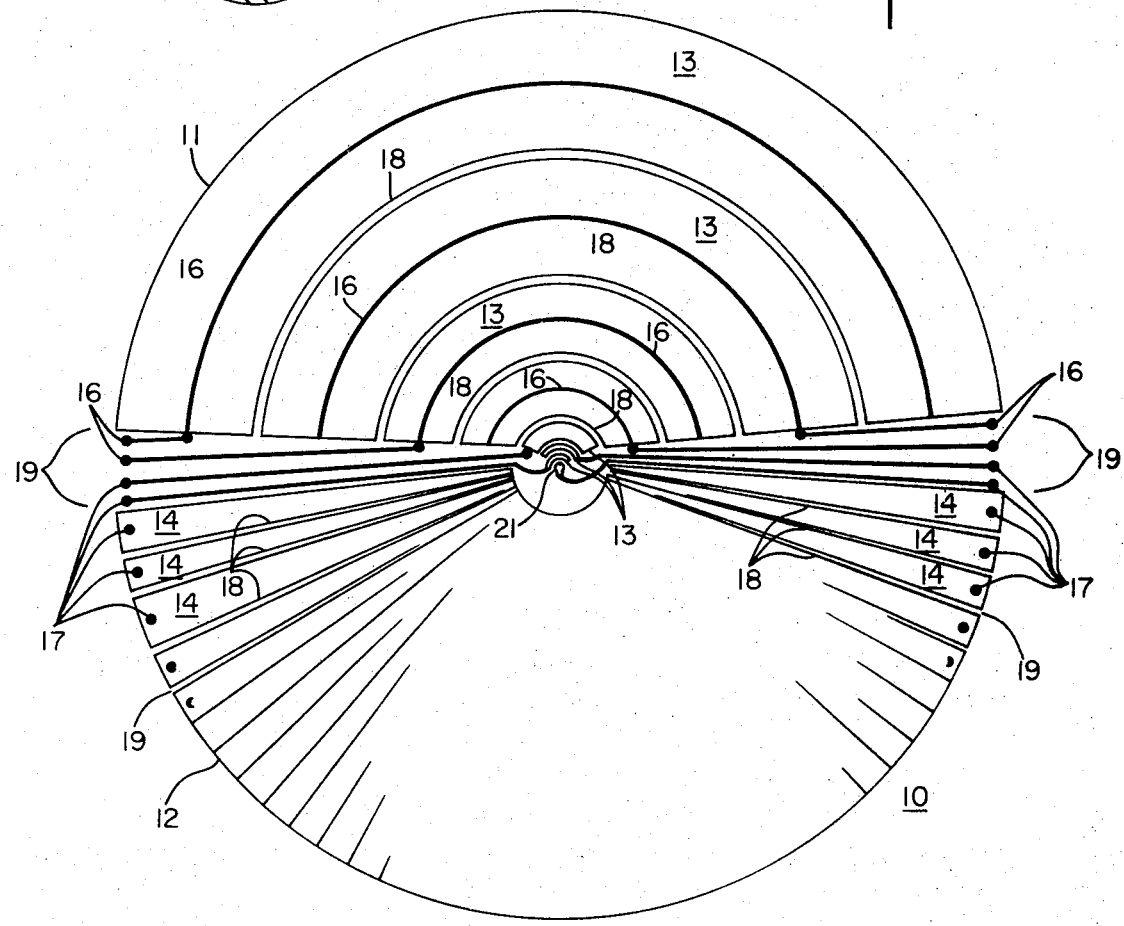

FIG. 1 illustrates schematically two types of idealized objects and their characteristic diffraction patterns; and FIG. 2 is a diagram of a detector array embodying the invention.

FIG. 1a represents an object in the form of a clear circular aperture, while FIG. 1c depicts a simple edge within a circular aperture as the light diffracting object. FIG. 1b is a diagram of the diffraction pattern produced by the circular aperture. The pattern consists of a small high-energy spot representing undiffracted energy and the zero-order diffraction. This spot is surrounded by concentric rings of decreasing energy. The diffraction pattern produced by the simple edge with a circular aperture is illustrated in FIG. 1d and comprises two spikes of energy at right angles to the edge. The spikes are surrounded by concentric rings from the remaining portion of the circular aperture. The sharper the edge, the longer the spikes of energy. In the diffraction patterns, distance from the optic axis is related to the spatial frequency of the object. The higher the spatial frequency, the greater the angle of diffraction and the greater the distance of the diffracted light from the center or optic axis of the pattern. The relation is:

$$r = F \lambda k$$

where $r$ is the distance from the optical axis, $F$ is the focal length of the transform lens, $\lambda$ is the wavelength of the illuminating light, and $k$ is the spatial frequency. The dimensions of $k$ are cycles per unit of length.

The diffraction patterns illustrated in FIGS. 1b and d are symmetric about the center-point. That is, $f(\vec{r}) = f(-\vec{r})$ where the function "$f(\vec{r})$" represents the energy in an elemental area of the pattern and $\vec{r}$ is the vector distance from the center-point to the elemental area. As a result, one-half of the pattern contains all of the available information relating to the object. The distribution of energy in the pattern may be measured by a special detector embodying the invention and comprising one sub-array of photocells adapted to sense the energy distribution as a function of angle and another sub-array adapted to sense the energy distribution as a function of radius.

The circular detector array 10 of the preferred form of the invention is illustrated in FIG. 2 and comprises two semi-circular sub-arrays 11 and 12 of photosensitive detectors for sampling the energy distribution in a circularly symmetric pattern. The first sub-array 11 comprises eight concentric annular hemi-ring or zone detectors 13 in a semi-circular array. The second sub-array 12 comprises 34 radial sector detectors 14 also in a semi-circular array. The ring detector array 11 samples the energy distribution of a pattern as a function of radius, which the sector array 12 samples the energy distribution as a function of angle. Each detector 13, 14 of the array is electrically well isolated from the others and is provided with its own separate electrical lead 16, 17. In the device depicted in FIG. 2, electrical isolation of the detectors is provided by electrically neutral areas or gaps 18. The sub-arrays 11 and 12 are separated by an electrically neutral gap 19.

Each detector of the array is provided with a separate electrical lead. The outer larger zone detectors are provided with leads 16 running along substantially their entire length to ensure uniformity of response, while the inner, smaller zones and the sector detectors are provided with leads 17 connected at their edges. Leads attached to the zone or annular detectors are brought to the outer edge of the array through gap 19 between the sub-arrays 11 and 12. In addition to providing space for leads to the inner ring detectors, gap 19 may function in some applications to suppress the effects of sampling the light energy from scratches or other artifacts of the optical system on the diffraction pattern seen by the detector. Thus, where the object diffracting the light is a film strip which has been carried in a typical film transport, there may be numerous scratches aligned in the direction of motion. The scratches diffract light in a manner similar to edges, producing spikes in the diffraction pattern. By orienting the detector to align gap 19 with the spikes, the undesirable scratch effects are not sampled. In the array 10 depicted in FIG. 2, a small circular detector 21 for sampling undefracted energy is located at the center and is provided with a lead 17 extending to the edge of the device along gap 19.

A special detector for diffraction pattern sampling may, according to the invention, be fabricated as a monolithic array of P on N silicon photovoltaic detectors by forming a layer of P type silicon on the surface of a crystal of highly conductive N type silicon. Using appropriate masks, the pattern of neutral areas is etched through the P layer and deeply into the N layer to provide the electrical isolation of the P layer. The leads between the two sub-arrays of FIG. 2 are also defined by deep etching and then covered with a metallic deposition for high conductivity. The deep etch provides the relatively good electrical isolation between the leads. The metal is deposited using masks as known in the art.

Although the preferred embodiment has been described in terms of an array of P on N photodetectors, other types of photodetectors may be used as well. For example, N on P, or PIN structures may be used as either a photodiode or a photovoltaic array in accordance with the principles of the invention. Many other variations and modifications are possible and may be made without departing from the scope and spirit of the invention as disclosed in this specification.

What is claimed is:

1. Apparatus for sampling the light energy distribution in the rear focal-plane of a spherical lens for sampling geometric relationships and the spectral density distribution of objects recorded on film transparencies, said apparatus comprising:
a single monolithic array of photodetectors having a circular array of detectors comprising first and second semi-circular sub-arrays of detectors;
the first sub-array comprising a plurality of annular detectors concentric about the center of the circular array; and
the second sub-array comprising a plurality of portions of sector detectors extending approximately radially from the center of the circular array.

2. Apparatus as claimed in claim 1 wherein each detector of the array is provided with a separate attached electrical conductor.

3. Apparatus as claimed in claim 1 wherein the first and second sub-arrays are separated by radial sector gaps.

4. Apparatus as claimed in claim 3 wherein each zone detector of the first sub-array is provided with a separated attached electrical conductor extending from the detector to the outer edge of the array, the conductors being positioned in the radial sector gaps.

5. Apparatus as claimed in claim 4 wherein said conductors are integral with the respective zone detector.

6. Apparatus as claimed in claim 2 wherein the electrical conductors of the second sub-array are attached to the sector detectors at the periphery of the array.

7. Apparatus as claimed in claim 1 wherein each sector detector of the second sub-array extends outward from a point on a radius of the circular array.

8. Apparatus as claimed in claim 1 and further including a circular detector at the center of the array.

9. Apparatus as claimed in claim 4 and further including a circular detector at the center of the array, the circular detector being provided with a separate attached electrical conductor positioned in one of the approximately radial sector gaps.

10. Apparatus as in claim 2 wherein a plurality of ring detectors of the first sub-array is provided with a separate attached electrical conductor extending accurately along the detector.

* * * * *

UNITED STATES PATENT OFFICE
CERTIFICATE OF CORRECTION

Patent No. 3,689,772    Dated September 5, 1972

Inventor(s) Nicholas George, James T. Thomasson, Abraham Spindel

It is certified that error appears in the above-identified patent and that said Letters Patent are hereby corrected as shown below:

On the title page, instead of "Litton Systems, Inc." the assignee should read:

--Recognition Systems, Inc.,
Van Nuys, CA.--

Signed and sealed this 10th day of April 1973.

(SEAL)
Attest:

EDWARD M. FLETCHER, JR.
Attesting Officer

ROBERT GOTTSCHALK
Commissioner of Patents